US010800400B2

(12) United States Patent
Kim

(10) Patent No.: US 10,800,400 B2
(45) Date of Patent: Oct. 13, 2020

(54) CONTROL SYSTEM FOR HYBRID VEHICLE

(71) Applicant: TOYOTA JIDOSHA KABUSHIKI KAISHA, Toyota-shi, Aichi (JP)

(72) Inventor: Jonggap Kim, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

(21) Appl. No.: 16/192,926

(22) Filed: Nov. 16, 2018

(65) Prior Publication Data
US 2019/0152469 A1 May 23, 2019

(30) Foreign Application Priority Data

Nov. 20, 2017 (JP) ................. 2017-222713

(51) Int. Cl.
*B60W 20/19* (2016.01)
*B60K 6/442* (2007.10)
*B60W 10/08* (2006.01)
*B60W 10/11* (2012.01)
*B60W 20/40* (2016.01)
(Continued)

(52) U.S. Cl.
CPC ............. *B60W 20/19* (2016.01); *B60K 6/442* (2013.01); *B60K 6/52* (2013.01); *B60K 6/547* (2013.01); *B60W 10/06* (2013.01); *B60W 10/08* (2013.01); *B60W 10/11* (2013.01); *B60W 20/20* (2013.01); *B60W 20/40* (2013.01); *B60K 2006/4808* (2013.01); *B60K 2006/4825* (2013.01); *B60W 2510/0638* (2013.01); *B60W 2510/083* (2013.01); *B60W 2510/1015* (2013.01); *B60W 2510/244* (2013.01); *B60W 2520/10* (2013.01); *B60W 2540/10* (2013.01); *B60W 2540/12* (2013.01); *B60W 2710/081* (2013.01); *B60W 2710/083* (2013.01); *B60W 2710/1005* (2013.01); *B60W 2710/1011* (2013.01)

(58) Field of Classification Search
CPC . B60K 6/442; B60K 6/48; B60K 6/52; B60K 6/547; B60W 10/06; B60W 10/08; B60W 10/10; B60W 10/11; B60W 20/20; B60W 20/40
See application file for complete search history.

(56) References Cited

U.S. PATENT DOCUMENTS

| 7,871,348 B2* | 1/2011 | Perkins | ................. B60K 6/442 475/5 |
| 8,775,043 B2* | 7/2014 | Imaseki | ................. B60K 6/36 701/67 |

(Continued)

FOREIGN PATENT DOCUMENTS

| EP | 2 127 984 A1 | 12/2009 |
| EP | 2 574 516 A2 | 4/2013 |

(Continued)

*Primary Examiner* — David R Morris
(74) *Attorney, Agent, or Firm* — Oliff PLC

(57) ABSTRACT

A control system for hybrid vehicles configured to improve an acceleration feeling or enhance acceleration. In the hybrid vehicle, an engine and a first motor are connected to an input side of a transmission, and a second motor is connected to drive wheels. A controller is configured to selectively execute a first assist control to raise an input speed to the transmission by the first motor, and a second assist control to increase an output torque of the second motor, depending on a required drive force.

8 Claims, 10 Drawing Sheets

(51) Int. Cl.
  *B60W 20/20*  (2016.01)
  *B60K 6/52*  (2007.10)
  *B60K 6/547*  (2007.10)
  *B60W 10/06*  (2006.01)
  *B60K 6/48*  (2007.10)

(56) References Cited

U.S. PATENT DOCUMENTS

| | | | |
|---|---|---|---|
| 8,874,295 B2* | 10/2014 | Terakawa | B60W 10/02 |
| | | | 701/22 |
| 9,120,483 B2 | 9/2015 | Sato et al. | |
| 9,527,375 B2* | 12/2016 | Clark | B60K 6/26 |
| 10,066,740 B2* | 9/2018 | Okamura | F16H 61/0213 |
| 2009/0186734 A1* | 7/2009 | Perkins | B60K 6/442 |
| | | | 475/5 |
| 2010/0324762 A1* | 12/2010 | Imaseki | B60K 6/36 |
| | | | 701/22 |
| 2013/0079966 A1* | 3/2013 | Terakawa | B60W 10/02 |
| | | | 701/22 |
| 2013/0253743 A1 | 9/2013 | Maruyama et al. | |
| 2015/0046011 A1 | 2/2015 | Imai et al. | |
| 2016/0052382 A1 | 2/2016 | Clark et al. | |
| 2017/0059035 A1 | 3/2017 | Okamura | |
| 2019/0135267 A1* | 5/2019 | Kim | B60K 6/52 |
| 2019/0170245 A1* | 6/2019 | Kim | F16H 61/0437 |

FOREIGN PATENT DOCUMENTS

| | | |
|---|---|---|
| JP | 3707258 B2 | 10/2005 |
| JP | 2017-048916 A | 3/2017 |

* cited by examiner

CONTROL SYSTEM FOR HYBRID VEHICLE

CROSS REFERENCE TO RELATED APPLICATIONS

The present disclosure claims the benefit of Japanese Patent Application No. 2017-222713 filed on Nov. 20, 2017 with the Japanese Patent Office, the disclosure of which are incorporated herein by reference in its entirety.

BACKGROUND

Field of the Disclosure

Embodiments of the present disclosure relate to the art of a control system for a hybrid vehicle provided with an engine and a motor as a prime mover, and more particularly to a control system for controlling a drive force or acceleration of a hybrid vehicle having a geared transmission when a required drive force is increased, in other words, when accelerating the hybrid vehicle.

Discussion of the Related Art

Japanese Patent No. 3707258 describes a control device for a four-wheel drive vehicle in which a prime mover includes an engine and a motor, and in which an output torque of the engine is delivered to drive wheels via a transmission. In the vehicle of this kind, the output torque of the engine is delivered to the drive wheels while being multiplied or reduced according to a speed ratio set in the transmission. That is, a drive torque derived from the output torque of the engine is reduced with a reduction in the speed ratio of the transmission. According to the teachings of Japanese Patent No. 3707258, therefore, an assist torque of the motor is increased with a reduction in the speed ratio to assist the drive torque.

JP-A-2017-48916 describes a method for executing a sensory test of acceleration. In the sensory test taught by JP-A-2017-48916, an unconscious period until a driver senses a change in acceleration, and a stimulation intensity calculated based on a change in the acceleration and a jerk are employed as parameters. According to the teachings of JP-A-2017-48916, if the unconscious period is shorter than an upper limit value and longer than a lower limit value, an evaluation score of acceleration is raised with an increase in the stimulation intensity and with a reduction in the unconscious period.

The control device taught by Japanese Patent No. 3707258 is configured to control the assist torque of the motor to achieve the required acceleration. However, the output torque of the motor may be restricted depending on a condition any hence the acceleration may not always satisfy the driver's acceleration demand. For example, when an accelerator pedal is further depressed during cruising at a predetermined speed, the motor is required to generate a torque at high speed to assist the torque. In this case, since a speed of the vehicle has been raised to a certain level, a road load has also been increased, and the motor torque is reduced with an increase in the speed. For these reasons, the motor may not generate torque sufficiently. Likewise, the motor may not generate torque sufficiently if a battery is not allowed to supply electric power sufficiently to the motor. In addition, if an inertia moment applied to the engine to reduce noise and vibration at low speed, an increase in a speed of the engine or a speed of the transmission connected to an output shaft of the engine may be delayed. In this case, the driver's acceleration demand may not be satisfied also.

As described, according to the teachings of JP-A-2017-48916, the evaluation of acceleration is made based on an increase in the acceleration, and a stimulation intensity until the driver starts sensing the acceleration. However, a technique to improve an acceleration feeling or an evaluation of acceleration is not known in the convectional art. At least Japanese Patent No. 3707258 and JP-A-2017-48916 do not describe about the technique to improve an acceleration feeling or an evaluation of acceleration when the assist torque of the motor to increase the acceleration is restricted.

SUMMARY

Aspects of embodiments of the present disclosure have been conceived noting the foregoing technical problems, and it is therefore an object of the present disclosure to provide a control system for a hybrid vehicle configured to improve an acceleration feeling or enhance acceleration even if a motor torque for assisting a drive force is insufficient.

The control system according to the embodiment of the present disclosure is applied to a hybrid vehicle in which an engine and a first motor are connected to an input side of an automatic transmission, and a second motor is connected to drive wheels. The control system comprises a controller that controls the first motor and the second motor. In order to achieve the above-explained objective, according to the embodiment of the present disclosure, the controller is configured to execute a selective control to selectively execute a first assist control to raise an input speed to the automatic transmission by the first motor, and a second assist control to increase an output torque of the second motor thereby increasing a drive force to propel the hybrid vehicle, based on a required drive force.

In a non-limiting embodiment, the controller may be further configured to: execute an acceleration demand determination to determine whether a driver intends to accelerate the hybrid vehicle; execute a drive force determination whether the output torque possible to be generated by the second motor is insufficient to achieve the required drive force to accelerate the hybrid vehicle, after executing the acceleration demand determination; select the first assist control when the output torque possible to be generated by the second motor is insufficient to achieve the required drive force; and select the second assist control when the second motor is allowed to generate the output torque to achieve the required drive force.

In a non-limiting embodiment, the acceleration demand determination may be made based on an increase in the required drive force and a satisfaction to execute a downshifting of the automatic transmission. The first assist control may be executed to expedite execution of the downshifting by raising the input speed by the first motor.

In a non-limiting embodiment, the drive force determination may be made based on a fact that a speed of the hybrid vehicle is higher than a reference speed.

In a non-limiting embodiment, the drive force determination may include a determination whether a speed of the hybrid vehicle is higher than a reference speed, and the required drive force was constant to cruise the hybrid vehicle immediately before the acceleration is demanded.

In a non-limiting embodiment, the control system may further comprise an electric storage device that supplies electricity to the first motor and the second motor. The drive force determination may include a determination whether a state of charge level of the electric storage device is lower than a level at which the second motor is allowed to generate a required power to execute the second assist control.

In a non-limiting embodiment, the controller may be further configured to inhibit execution of the second assist control by the second motor during execution of the first assist control by the first motor.

In a non-limiting embodiment, the controller may be further configured to inhibit execution of the second assist control by the second motor during execution of the first assist control by the first motor.

In a non-limiting embodiment, the controller may be further configured to: determine whether the downshifting to be executed in response to an increase in the acceleration demand is a step shifting to shift a gear stage of the automatic transmission to a target stage that is two or more stages lower than the current stage via an interim stage; execute the first assist control to expedite execution of the downshifting by raising the input speed to the automatic transmission by the first motor until the completion of the downshifting, if execution of the step shifting is determined; and execute the second assist control to drive the second motor when shifting the gear stage from the interim stage to the target stage.

In a non-limiting embodiment, the hybrid vehicle may comprise front wheels to which the second motor is connected, rear wheels to which the torque is delivered from the automatic transmission, and a transfer that delivers the torque delivered from the automatic transmission to the front wheels. The second motor may be connected to the transfer.

Thus, according to the embodiment of the present disclosure, the first assist control to raise an input speed to the transmission by the first motor, and the second assist control to increase the output torque of the second motor is executed selectively depending on the required drive force. Specifically, when the driver intends to accelerate the vehicle and any one of the first assist control and the second assist control is executed, the controller determines whether the torque possible to be generated by the second motor is insufficient to achieve the required dive force to accelerate the vehicle. If the second motor is allowed to generate the torque sufficient to achieve the required drive force, the second assist control is executed to increase the output torque of the second motor. Consequently, the hybrid vehicle is accelerated sufficiently to improve acceleration feeling. By contrast, if the output torque of the second motor is insufficient to achieve the required drive force to accelerate the vehicle, the first assist control is executed to raise the input speed of the transmission by the first motor. In this case, the drive force will not be increased even if the first motor generates a torque or increases an output torque. However, execution of the downshifting is expedited so that a speed ratio of the transmission is increased earlier. Consequently, the drive force as well as the acceleration is increased rapidly. That is, a plateau period of the acceleration can be reduced. For this reason, the hybrid vehicle can be accelerated sufficiently and the acceleration feeling can be improved.

For example, when the hybrid vehicle is cruising at a speed higher than the reference speed, the second motor may not be allowed to generate the torque sufficiently to accelerate the hybrid vehicle. In this situation, the second motor has already been operated to generate the torque at a certain speed, and a road load is large. Therefore, it is difficult to accelerate the hybrid vehicle by executing the second assist control. In this situation, therefore, the shift assist control is executed instead of the second assist control, so as to expedite execution of the downshifting by the first motor. To this end, insufficiency of the torque to accelerate the hybrid vehicle may be determined based on a depression of an accelerator pedal and a vehicle speed.

If the state of charge level of the battery falls below the predetermined level when executing the downshifting in response to an increase the required drive force, the first assist control is executed instead of the second assist control to expedite execution of the downshifting. In order to increase the input speed to the transmission, a required torque of the first motor is smaller than a required torque of the second motor. Therefore, the downshifting can be expedited utilizing the electricity accumulated in the battery to increase the acceleration rapidly and the acceleration feeling can be improved.

When expediting execution of the downshifting by the first assist control while inhibiting the second assist control, electric power supply to the second motor may be stopped. In this case, the electricity to be supplied to the first motor can be ensured so that the input speed to the transmission can be raised certainly by the first motor.

In the case of executing the step shifting, the input speed to the transmission is raised by the first motor when shifting the gear stage to the interim stage. Consequently, the downshifting is caused earlier so that the drive force is increased rapidly. Then, the second assist control is executed when shifting the gear stage from the interim stage to the target stage to further increase the acceleration. For these reasons, the driver is allowed to sense the increase in the acceleration sufficiently and continuously. Thus, the acceleration feeling can be improved even during execution of the step shifting.

BRIEF DESCRIPTION OF THE DRAWINGS

According Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
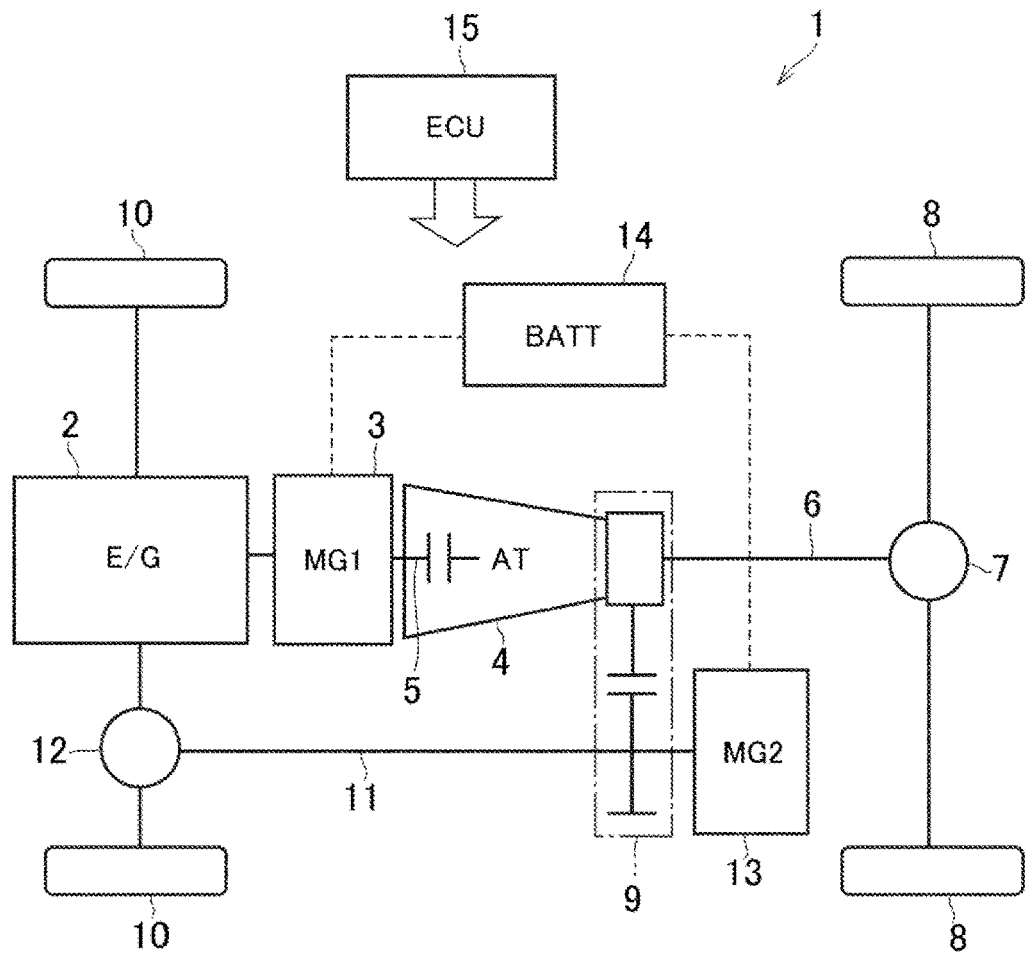
FIG. 1 is a schematic illustration showing a structure of the hybrid vehicle to which the control system according to the embodiment of the present disclosure is applied.

Embodiments of the present disclosure will now be explained with reference to the accompanying drawings. Turning now to FIG. 1, there is shown a structure of a hybrid vehicle (as will be simply called the "vehicle" hereinafter) 1 to which the control system according to the embodiment is applied. The vehicle 1 is a front-engine/rear-drive layout four-wheel drive vehicle in which an engine (referred to as "ENG" in FIG. 1) 2 is arranged in a front section of the vehicle 1. In the vehicle 1, a first motor (referred to as "MG1" in FIG. 1) 3 and an automatic transmission (referred to as "A/T" in FIG. 1) are arranged downstream of the engine 2. Specifically, an output shaft of the engine 2 and a rotor shaft of the first motor 3 are connected to an input shaft 5 of the automatic transmission (as will be simply called the "transmission" hereinafter) 5.

For example, an internal combustion engine such as a gasoline engine and a diesel engine may be used as the engine 2. An opening degree of an accelerator and a fuel injection in the engine 2 are controlled in accordance with a depression of an accelerator pedal (i.e., an opening degree of an accelerator) to generate a required torque. The engine 2 may be idled while stopping a fuel supply to the engine 2 by a fuel-cutoff control. In this case, an engine braking force may be generated by a power loss such as a pumping loss. For example, a permanent magnet synchronous motor, that is, a motor-generator may be used as the first motor 3, and the first motor 3 is operated mainly as a generator.

The transmission 4 is a geared transmission in which a gear stage is shifted among a plurality of stages, and for example, an automatic transmission described in JP-A-2017-155779 or the like may be adopted as the transmission 4. In the vehicle 1, an automatic transmission of the kind described in JP-A-2017455779 without having a torque converter may also be adopted as the transmission 4. A gear stage of the transmission 4 is shifted by electrically manipulating a plurality of engagement devices (not shown). A shifting operation of the transmission 4 is executed when an operating point of the vehicle 1 governed by a position of the accelerator pedal and a vehicle speed shifts across a shifting boundary defining regions of the gear stages in a shifting map. Specifically, a target stage is determined based on a position of the accelerator pedal and a vehicle speed or a rotational speed of a predetermined rotary member corresponding to the vehicle speed, and the engagement devices are engaged and disengaged to establish the target stage. The gear stage may be shifted not only stage by stage, but also to the stage two or more stages higher or lower than the current stage. In a case of shifting the gear stage two or more stages higher or lower than the current stage, the gear stage may be shifted to the target stage via an interim stage by a so-called "step shifting".

The transmission 4 is connected to a rear differential gear unit 7 through a rear propeller shaft 6 so that a drive torque is distributed from the rear differential gear unit 7 to rear wheels 8. A transfer 9 is also disposed downstream of the transmission 4 so as to deliver output torque of the transmission 4 partially to front wheels 10 in a four-wheel drive mode. To this end, the transfer 9 is connected to a front differential gear unit 12 through a front propeller shaft 11 so that the torque is distributed from the front differential gear unit 12 to the front wheels 10.

For example, the transfer 9 may be a part-time transfer including a clutch (not shown) that selectively interrupts torque transmission to a gear train (not shown) for delivering torque to the front propeller shaft 11, a full-time transfer that always distributes torque to the front wheels 10 and the rear wheels 8 while allowing a differential rotation between the front wheels 10 and the rear wheels 8, and a full-time transfer that can selectively restricts a differential rotation between the front wheels 10 and the rear wheels 8.

A second motor (referred to as "MG2" in FIG. 1) 13 is connected to the transfer 9 to drive the front propeller shaft 11 (i.e., the front wheels 10). The second motor 13 is operated mainly as a motor to generate a drive torque to propel the vehicle 1, and hence a motor having a greater capacity than the first motor 3 is adopted as the second motor 13. In order to regenerate energy during deceleration, it is preferable to use a motor-generator such as a permanent magnet synchronous motor as the second motor 13.

The first motor 3 and the second motor 13 are electrically connected with an electric storage device (referred to as "BATT" in FIG. 1) 14 such as a battery and a capacitor. In the vehicle 1, therefore, the first motor 3 and the second motor 13 may be operated individually as a motor by supplying electricity to those motors from the electric storage device 14, and electricity generated by the first motor 3 and the second motor 13 may be accumulated in the electric storage device 14. It is also possible to operate the second motor 13 as a motor by supplying electricity generated by the first motor 3 to the second motor 13 to propel the vehicle 1 by an output torque of the second motor 13. If the transfer 9 is configured to selectively interrupt torque transmission therethrough, the vehicle 1 is allowed to be propelled in a front-drive mode by the torque of the second motor 13 when interrupting the torque transmission through the transfer 9.

Figure 2:
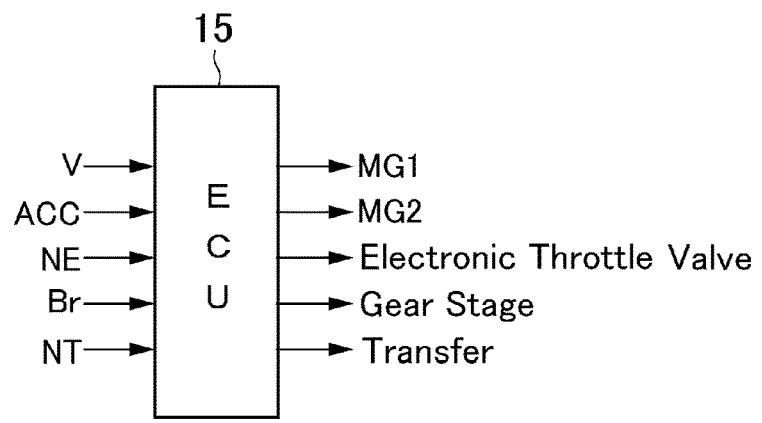
FIG. 2 is a block diagram showing incident data and output commands to/from an electronic control unit.

The engine 2, the first motor 3, the second motor 13, the transmission 4, the transfer 9 etc. are controlled by an electronic control unit (to be abbreviated as the "ECU" hereinafter) 15 as a controller. The ECU 15 is composed mainly of a microcomputer, and is configured to execute a calculation based on incident data as well as data installed in advance, and transmits a calculation result in the form of command signal. The ECU 15 may also be formed by integrating an engine control unit, a motor control unit, a transmission control unit and so on. As shown in FIG. 2, the ECU 15 receives data about; a vehicle speed V; an accelerator position ACC; a state of charge (to be abbreviated as the "SOC" hereinafter) level of the electric storage device 14; an engine speed NE; an activation signal Br of the brake; a rotational speed NT of the input shaft 5 and so on. The ECU 15 transmits command signals for controlling the first motor 3, the second motor 13, an electronic throttle valve of the engine 2, the gear stage of the transmission 4, the transfer 9 and so on.

When a required drive force is increased to accelerate the vehicle 1, a downshifting of the transmission 4 is executed. In this situation, the control system according to the embodiment executes an assist control to enhance acceleration or to improve an acceleration feeling. Specifically, the assist control is executed to sufficiently increase the acceleration sensed by the driver, to increase the drive force thereby allowing the driver to sense the acceleration in sort time, or to expedite execution of downshifting. In principle, acceleration is increased by increasing drive force. In the normal condition, therefore, a torque assist control as a second assist control is basically executed to increase acceleration by increasing an output torque of the second motor 13. By contrast, if an increasing amount of the output torque of the second motor 13 is insufficient and hence the required drive force thus increased cannot be achieved, a shift assist control as a first assist control is executed to expedite execution of downshifting.

Figure 3:
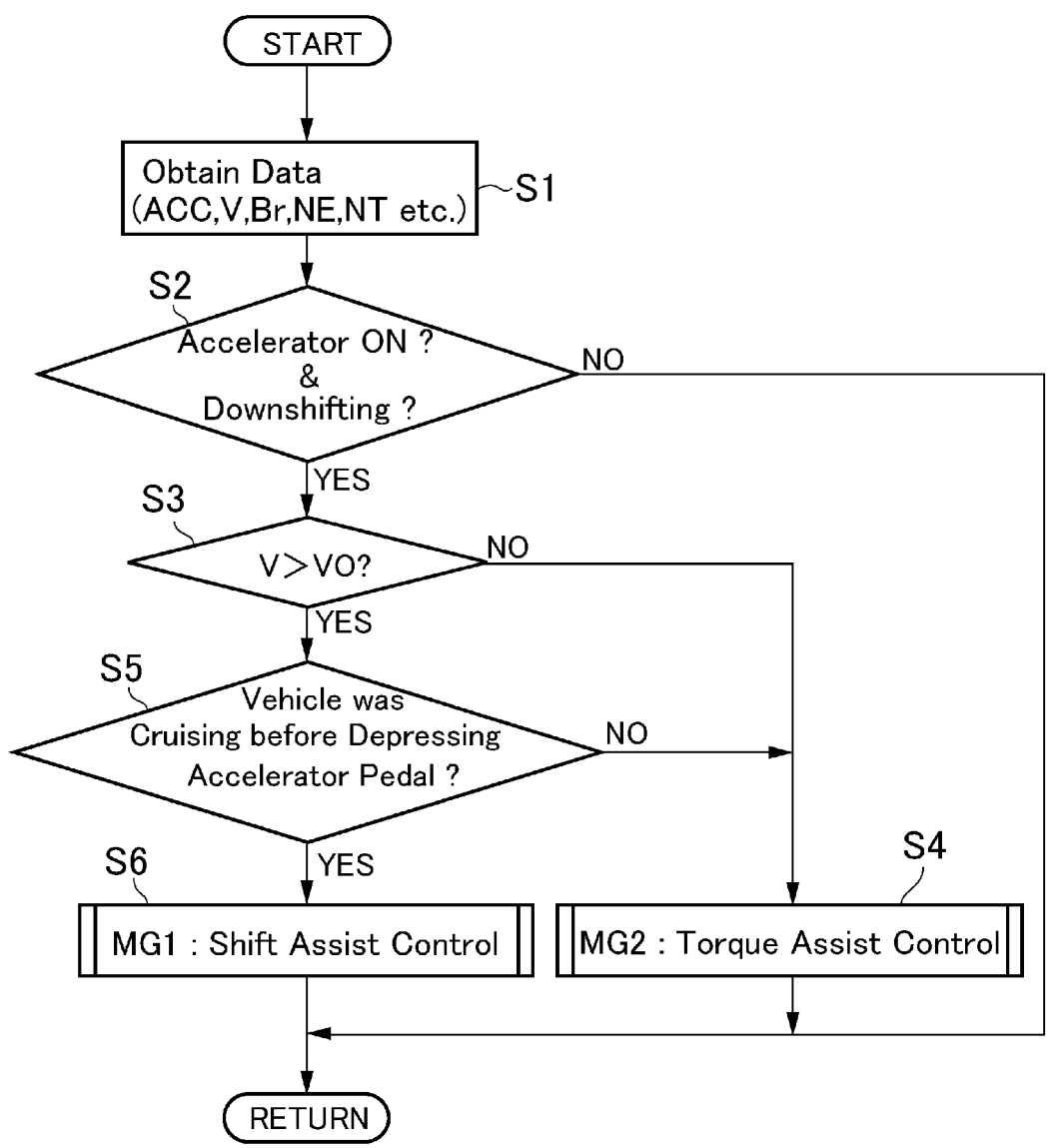
FIG. 3 is a flowchart showing one example of a routine to be executed by the control system according to the embodiment of the present disclosure.

In order to selectively execute the first assist control and the second assist control depending on the situation, the control system according to the embodiment executes a routine shown in FIG. 3. The routine shown in FIG. 3 is executed repeatedly at predetermined short interval during propulsion of the vehicle 1. At step S1, data about an accelerator position ACC, a vehicle speed V, an activation signal Br of the brake, an engine speed NE etc. are obtained. Then, it is determined at step S2 whether the driver intends to accelerate the vehicle 1 based on the data obtained at step S1. That is, a determination of an acceleration demand is made at step S2. For example, such determination at step S2 may be made based on an increasing amount of a depression of an accelerator pedal (not shown). In addition, such determination at step S2 may also be made based on a satisfaction of a condition to execute a downshifting. At step S2, therefore, it is determined whether the accelerator pedal is depressed, and whether the condition to execute a downshifting is satisfied. Specifically, the determination of depression of the accelerator pedal may be made based on a fact that a current value of the depression ACC of the accelerator pedal has been increased from a previous value of e.g., several seconds ago. On the other hand, the determination of satisfaction of the condition to execute the downshifting may be made based on a fact that a lower target stage has been set based on the vehicle Speed V and the depression ACC of the accelerator pedal with reference to the shift map.

For example, if the accelerator pedal is returned, if the depression ACC of the accelerator pedal is maintained, if an increasing amount of the depression ACC is smaller than the predetermined value and hence the downshifting will not be caused, or if the downshifting is caused due to reduction in the vehicle speed V, the driver does not intend to increase the drive force and hence the answer of step S2 will be ISO. In those cases, it is unnecessary to execute any of the aforementioned assist controls, therefore, the routine returns.

By contrast, if the driver intends to accelerate the vehicle 1 so that the answer of step S2 is YES, the routine progresses to step S3 to execute a drive force determination. At step S3, specifically, it is determined whether the required acceleration cannot be achieved by executing the torque assist control to increase the output torque of the second motor 13, in other words, it is determined whether the torque possible to be generated by the second motor 13 is insufficient to achieve the increased required drive force. Specifically, the control system determines that the torque possible to be generated by the second motor 13 is insufficient to achieve the required drive force, if a score of a sensory test of acceleration in a case of executing the torque assist control by the second motor 13 is lower than a predetermined value, or lower than a score of the sensory test of acceleration in a case of executing the shift assist control by the first motor 3.

Figure 4:
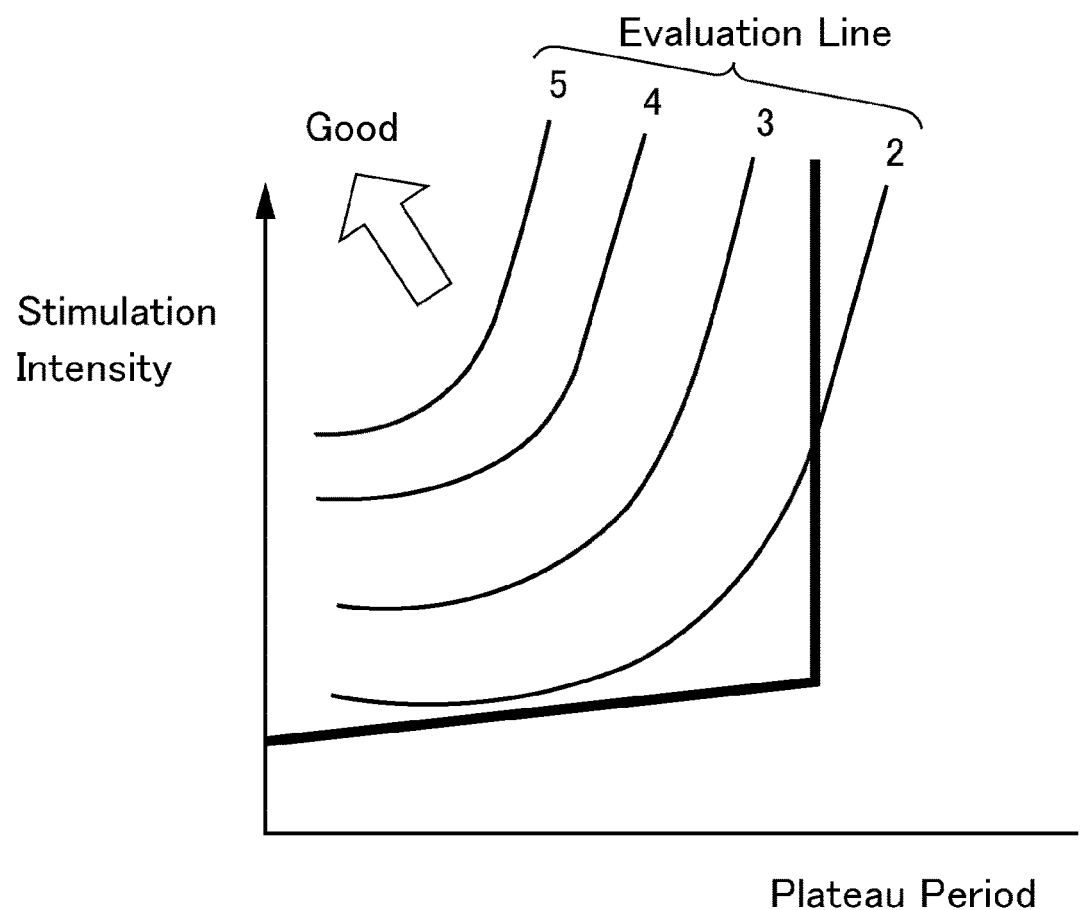
FIG. 4 is a graph showing a score of a sensory test of acceleration.

For example, acceleration feel may be evaluated by the sensory test described in JP-A-2017-48916. In the sensory test, a stimulation intensity as a product of a change amount of acceleration and a jerk, and a plateau period from a point at which an accelerating operation is commenced to a point at which the driver is allowed to sense a change in the acceleration, are used as parameters. A score of the sensory test is increased with an increase in the stimulation intensity and a reduction in the plateau period. FIG. 4 is a map for evaluating the acceleration feel prepared based on the scores of the sensory test conducted multiple times by driving the vehicle by a monitor(s). In FIG. 4, the vertical axis represents the stimulation intensity, the horizontal axis represents the plateau period, and thin curves are evaluation lines. As can be seen from FIG. 4, the score of the sensory test is increased with an increase in the stimulation intensity and a reduction in the plateau period. In FIG. 4, the thick solid line is a boundary line defining a region where the evaluation score is acceptable. If the stimulation intensity is smaller than the boundary line and the plateau period is longer than the boundary line, a change in the acceleration is too small and the period until the acceleration starts changing is too long. In this case, therefore, the evaluation score falls outside of the acceptable region within the boundary line, and hence the driver may not feel the acceleration sufficiently.

Such determination of insufficiency of the output torque of the second motor 13 to achieve the required drive force is made based on a vehicle speed V and a driving condition immediately before the accelerator pedal is depressed. At step S3, specifically it is determined whether the vehicle speed V is higher than a reference speed V0 set e.g., to 70 to 80 km/h. The output torque of the second motor 13 is reduced gradually with an increase in a speed of the second motor 13 after the speed of the second motor 13 exceeds a certain speed level. That is, if the vehicle speed V is high, the torque possible to be generated by the second motor 13 to increase the acceleration is small. In this case, therefore, the required acceleration may not be achieved even if the torque assist control to increase the output torque of the second motor 13 is executed. Otherwise, if the vehicle speed V is lower than the reference speed V0 so that the answer of step S3 is NO, the second motor 13 is allowed to generate torque sufficiently. In this case, therefore, the routine progresses to step S4 to execute the torque assist control by increasing the output torque of the second motor 13 to increase the acceleration. Thereafter, the routine returns.

Here will be explained the torque assist control using the second motor 13 in more detail. The acceleration of the vehicle 1 established by operating the second motor 13 as a motor is governed mainly by the torque possible to be generated by the second motor 13 and a weight of the vehicle 1. Therefore, the reference speed V0 can be set depending on a class or grade of the vehicle based on a result of experiment or simulation. In order to assist the torque for propelling the vehicle 1, the output torque of the second motor 13 may be increased at a timing when the accelerator pedal is further depressed, or when an output torque of the engine 2 is increased by further depressing the accelerator pedal. An increasing amount of the output torque (i.e., an assist amount) of the second motor 13 may be determined in advance in accordance with the depression ACC of the accelerator pedal or an increasing amount of the depression ACC. During execution of the torque assist control by the second motor 13, the electricity is supplied to the second motor 13 but not supplied to the first motor 3. That is, the shift assist control by the first motor 3 is inhibited. In this situation, the first motor 3 is allowed to regenerate energy, and electricity regenerated by the first motor 3 may be supplied to the second motor 13.

The determination of insufficiency of the output torque of the second motor 13 to achieve the required drive force may be made based only on a vehicle speed V. In addition, in the routine shown in FIG. 3, insufficiency of the output torque of the second motor 13 to achieve the required drive force is determined based also on a driving condition immediately before the accelerator pedal is depressed. Accordingly, if the vehicle speed V is higher than the reference speed V0 so that the answer of step S3 is YES, the routine progresses to step S5 to determine whether the vehicle 1 was cruising at a constant speed immediately before the accelerator pedal is depressed. At step S5, specifically, it is determined whether the accelerator pedal is depressed slightly and a depression of the accelerator pedal is maintained to propel the vehicle 1 at a constant speed or slightly accelerate the vehicle 1. If the answer of step S5 is NO, the routine also progresses to step S4 to execute the torque assist control by increasing the output torque of the second motor 13 to increase the acceleration. Thereafter, the routine returns. In this case, the accelerator pedal is not depressed and hence the vehicle 1 is decelerated. That is, if the required drive force is increased and the acceleration is increased even slightly, the deceleration is turned into positive acceleration and the stimulation intensity is increased. In this case, therefore, the driver is allowed to sufficiently sense the acceleration by executing the torque assist control by the second motor 13, even if the vehicle speed V is high and hence the torque possible to be generated by the second motor 13 is smaller than that of the case in which the vehicle speed V is low, or even if the electricity possible to be supplied from the electric storage device 14 to the second motor 13 is small.

By contrast, if the vehicle 1 was cruising at a constant speed immediately before the accelerator pedal is depressed so that the answer of step S5 is YES, the routine progresses to step S6 to execute the shift assist control by the first motor 3, and thereafter returns. In this case, the torque assist control by the second motor 13 may be inhibited by stopping electric power supply to the second motor 13. Specifically, the shift assist control is executed to raise a rotational speed NT of the input shaft 5 of the transmission 4 by an output torque of the first motor, by supplying electricity from the electric storage device 14 only to the first motor 3 thereby operating the first motor 3 as a motor. Here, the rotational speed NT of the input shaft 5 of the transmission 4 is increased in the same direction as a rotational direction of the engine 2. In this case, specifically, the first motor 3 generates the torque in such a manner that the rotational speed NT of the input shaft 5 of the transmission 4 is increased at a predetermined rate. To this end, the output torque of the first motor 3 may be controlled by transmitting a command signal set based on a result of experiment or the like to the first motor 3. Instead, the output torque of the first motor 3 may be controlled by a feedback method using a detection signal of the rotational speed NT of the input shaft 5 of the transmission 4. In order to raise the rotational speed NT of the input shaft 5 of the transmission 4, the output torque of the first motor 3 may be increased at a timing when the accelerator pedal is further depressed, or when an output torque of the engine 2 is increased by further depressing the accelerator pedal.

In this case, the rotational speed NT of the input shaft 5 is raised by the first motor 3 in the condition where the downshifting is executed by the transmission 4. Therefore, the rotational speed NT of the input shaft 5 is raised to a synchronous speed in the target stage by operating the first motor 3 as a motor so that execution of the downshifting is expedited. In this case, when the accelerator pedal is depressed, the engine 2 is started and the output torque of the engine 2 is increased. In addition, the output torque of the first motor 3 is added to the output torque of the engine 2 so that the rotational speed NT of the input shaft 5 is raised rapidly in comparison with a case of raising the rotational speed NT of the input shaft 5 only by the output torque of the engine 2. Especially, if the torque converter is omitted and an inertial moment of the flywheel is increased to improve the noise and vibration characteristics in a low speed range, a speed of the engine 2 would not be raised promptly. In this case, however, the first motor 3 generates the torque to raise the speed of the engine 2 so that the downshifting of the transmission 4 is expedited. For this reason, the drive torque is increased rapidly by the downshifting of the transmission 4 so that the driver is allowed to sense an increase in acceleration in short time. That is, the score of evaluation of acceleration is increased.

The motors to be used in the above-explained assist controls are indicated in the following table 1. In table 1, the definition of "Low Speed" is that the vehicle speed V is lower than the reference speed V0, and the definition of "High Speed" is that the vehicle speed V is higher than the reference speed V0. On the other hand, the definition of "Fully Closed" is that the depression ACC of the accelerator pedal has been increased from "0", and the definition of "Constant" is that the depression ACC of the accelerator pedal has been increased from a degree maintained to cruise the vehicle 1.

TABLE 1

|  | Low Speed | High Speed |
| --- | --- | --- |
| Fully Closed | MG2 | MG2 |
| Constant | MG2 | MG1 |

Thus, according to the embodiment of the present disclosure, the shift assist control and the torque assist control are selectively executed when the required drive force is increased depending on the depression ACC representing the required drive force, or the increasing amount of the depression ACC. Accordingly, steps S2 to S6 correspond to a "selective control" of the embodiment.

Here will be explained examples to execute the routine shown in FIG. 3 in different situations with reference to FIGS. 5a to 8b.

Figure 5A:
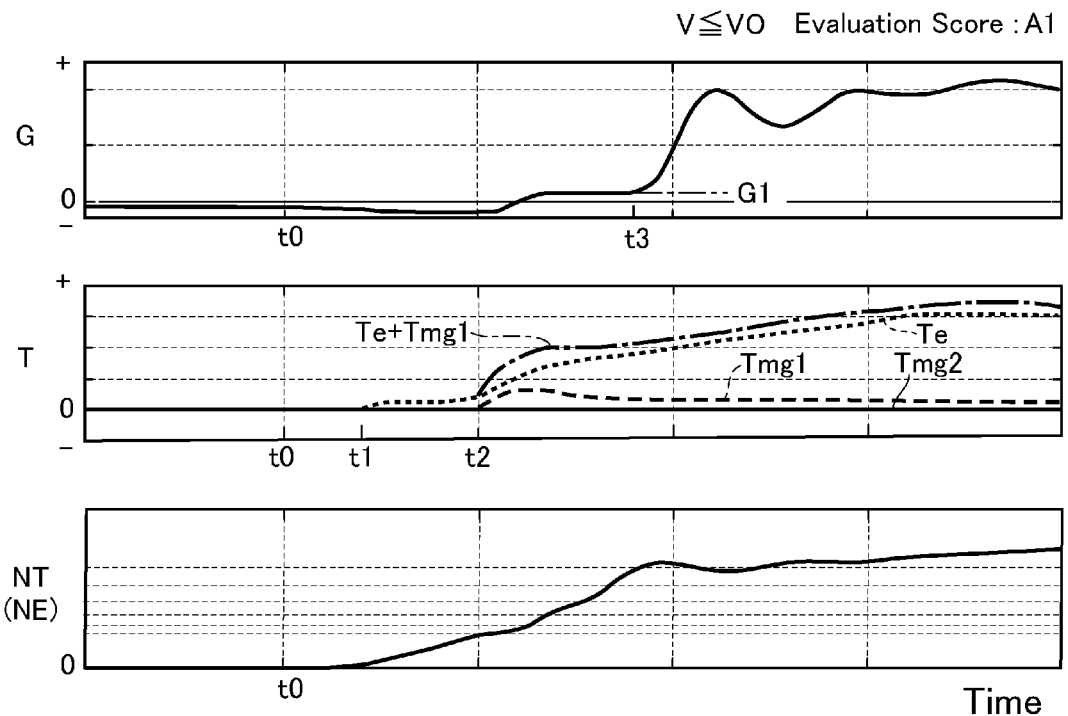
FIGS. 5a and 5b are time charts showing temporal changes in acceleration, torque, and input speed, during execution of a shift assist control by a first motor and a torque assist control by a second motor when accelerating the vehicle decelerating at a low speed.
Figure 5B:
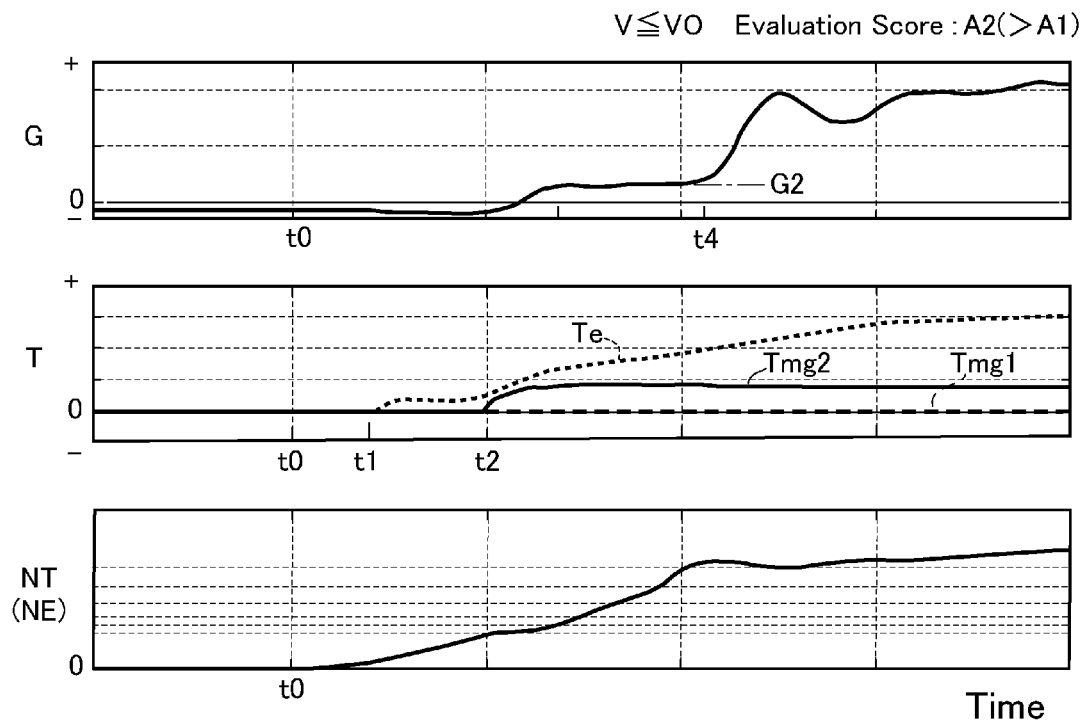

FIGS. 5a and 5b show examples of executing the routine shown in FIG. 3 in a condition where the vehicle 1 is decelerated at a speed lower than the reference speed V0. Specifically, FIG. 5a shows a situation in which the shift assist control by the first motor 3 is executed in the above-mentioned condition, and FIG. 5b shows a situation in which the torque assist control by the second motor 13 is executed in the above-mentioned condition. In this case, before executing the routine shown in FIG. 3, the vehicle 1 is being decelerated and hence an acceleration G is negative. In this situation, a torque T of the prime mover (including a torque Te of the engine 2, a torque Tmg1 of the first motor 3, and a torque Tmg2 of the second motor 13), and an engine speed NE are zero. The accelerator pedal is depressed at point t0, that is, the required drive force is increased at point t0. Consequently, the engine 2 is cranked by the first motor 3, in other words, a motoring of the engine 2 is executed and the engine speed NE is increased gradually. The startup of the engine 2 is completed at point t1, and the engine torque Te starts increasing from point U. In the case of executing the shift assist control by the first motor 3, as shown in FIG. 5a, the output torque Tmg1 of the first motor 3 increases from point t2, and consequently the engine speed NE and the rotational speed NT of the input shaft 5 (to be simply called the "input speed NT" hereinafter) is increased from point t2. As a result, the downshifting of the transmission 4 is expedited. In this case, however, the torque assist control by the second motor 13 is not executed, and in addition, the engine torque Te is consumed to raise the speed. For these reasons, in the initial phase of an increase in the depression ACC of the accelerator pedal, the acceleration G increased only to a relatively lower level G1. Then, since the input speed NT has been raised to expedite execution of downshifting, the downshifting of the transmission 4 is completed at point t3, and consequently the acceleration G is further increased. In this case, although the acceleration G is increased, it takes relatively longer time to increase the acceleration G to the sensible level from point t0. That is, the plateau period is increased.

In the case of executing the torque assist control by the second motor 13, as shown in FIG. 5b, the second motor 13 generates the torque Tmg2 at point t2 to drive the front wheels 10. Consequently, in the initial phase of an increase in the depression ACC of the accelerator pedal, the acceleration G is increased to a level G2 that is higher than the level G1 of the case of executing the shift assist control by the first motor 3. In this case, the input speed NT is raised only by the engine 2, therefore, the downshifting is not expedited and completed at point t4 after point t3. Consequently, the acceleration G is further increased from point t4. That is, the acceleration G is increased continuously.

In the case of executing the shift assist control by the first motor 3, although downshifting of the transmission 4 is expedited, an increasing amount of the acceleration G in the initial phase is relatively small. By contrast, in the case of executing the torque assist control by the second motor 13, the output torque of the second motor 13 is delivered to the front wheels 10 as the drive wheels in the four-wheel drive mode. In this case, therefore, the acceleration G of the vehicle 1 can be further increased. Especially, in the examples shown in FIGS. 5a and 5b, the vehicle 1 being decelerated is accelerated. Therefore, the stimulation intensity of the acceleration G sensed by the driver can be increased without increasing the output torque Tmg2 of the second motor 13 significantly. For this reason, in the examples shown in FIGS. 5a and 5b, an evaluation score A2 of acceleration feeling in the case of executing the torque assist control by the second motor 13 is higher than an evaluation score A1 of acceleration feeling in the case of executing the shift assist control by the first motor 3 (A1<A2).

Figure 6A:
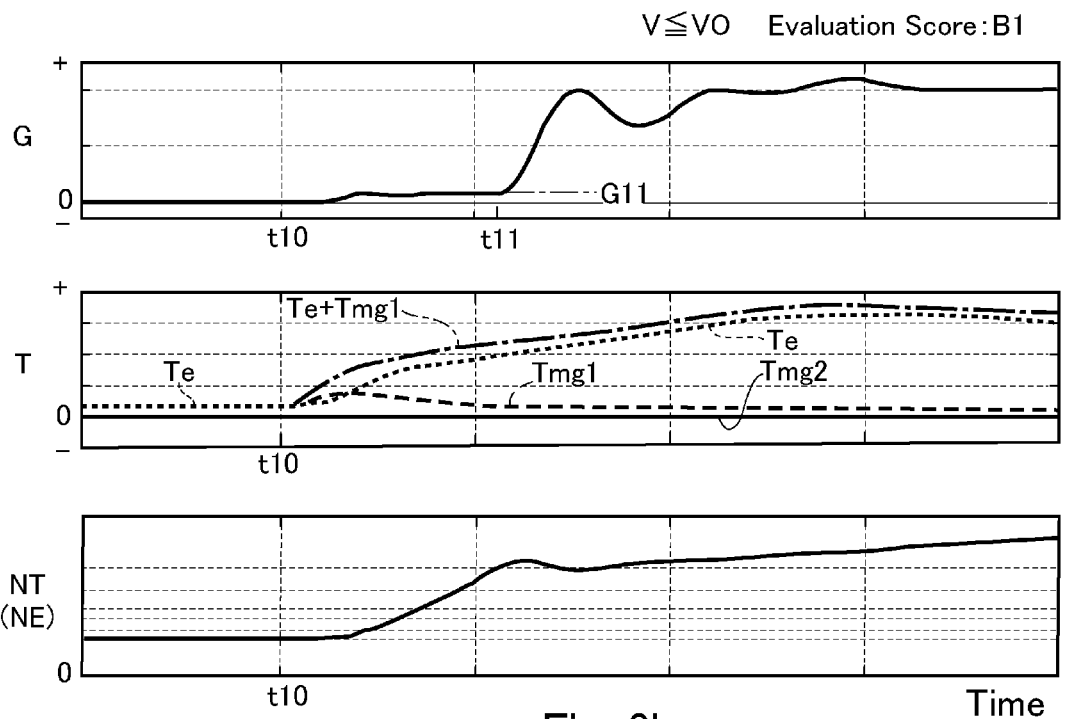
FIGS. 6a and 6b are time charts showing temporal changes in acceleration, torque, and input speed, during execution of the shift assist control by the first motor and the torque assist control by the second motor when accelerating the vehicle cruising at a low speed.
Figure 6B:
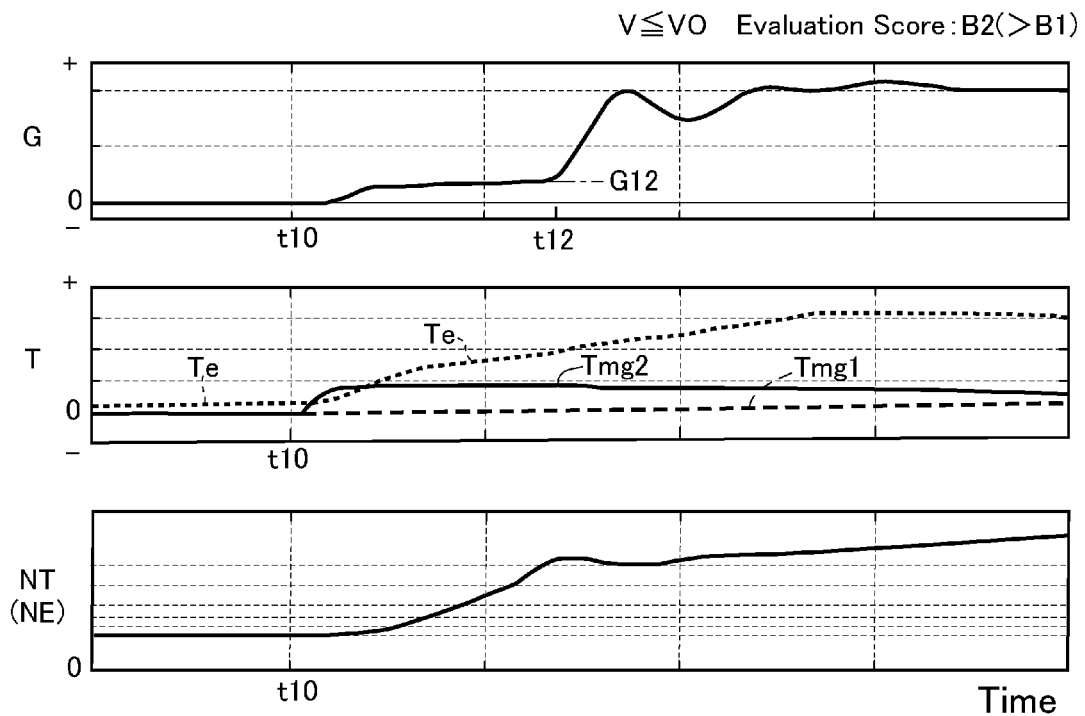

FIGS. 6a and 6b show examples of executing the routine shown in FIG. 3 in a condition where the vehicle 1 is cruising at a speed lower than the reference speed V0. Specifically, FIG. 6a shows a situation in which the shift assist control by the first motor 3 is executed in the above-mentioned condition, and FIG. 6b shows a situation in which the torque assist control by the second motor 13 is executed in the above-mentioned condition. In this case, before executing the routine shown in FIG. 3, the vehicle 1 is cruising and hence an acceleration G is substantially zero. In this situation, the engine 2 generates a torque Te to maintain the vehicle speed V against a road load at a predetermined speed NE. On the other hand, neither of the first motor 3 and the second motor 13 is operated as a motor nor a generator, therefore, the torque Tmg1 of the first motor 3 and the torque Tmg2 of the second motor 13 are respectively zero. The accelerator pedal is depressed at point t10, that is, the required drive force is increased at point t10. Consequently, the engine torque Te is increased gradually with an increase in depression ACC of the accelerator pedal. In the case of executing the shift assist control by the first motor 3, as shown in FIG. 6a, the input speed NT is increased gradually by the output torque Tmg1 of the first motor 3 slightly after the increase in the engine torque Te. In this case, execution of downshifting is expedited by thus raising the input speed NT by the output torque Tmg1 of the first motor 3 so that the downshifting of the transmission 4 is completed at point t11. Consequently, the acceleration G is increased gradually with an increase in a speed ratio of the transmission 4. In this case, however, the torque assist control by the second motor 13 is not executed. For this reason, in the initial phase of an increase in the depression ACC of the accelerator pedal, the acceleration G increased only to a relatively lower level G11.

In the case of executing the torque assist control by the second motor 13, as shown in FIG. 6b, the second motor 13 generates the torque Tmg2 at point t10 or immediately after point t10 to drive the front wheels 10. Consequently, in the initial phase of an increase in the depression ACC of the accelerator pedal, the acceleration G is increased to a level G12 that is higher than the level G11 of the case of executing the shift assist control by the first motor 3. In this case, the input speed NT is raised only by the engine 2, therefore, the downshifting is not expedited and completed at point t12 after point t11. Consequently, the acceleration G is further increased from point t12.

In the case of executing the shift assist control by the first motor 3, although downshifting of the transmission 4 is expedited, an increasing amount of the acceleration G in the initial phase is relatively small. By contrast, in the case of executing the torque assist control by the second motor 13, the output torque of the second motor 13 is delivered to the front wheels 10 as the drive wheels in the four-wheel drive mode. In this case, therefore, the acceleration G of the vehicle 1 can be further increased. In this case, in order to execute the torque assist control by the second motor 13 in the cruising vehicle 1, it is necessary to raise the speed of the second motor 13 to a certain level. However, since the vehicle speed V is lower than the reference speed V0, it is unnecessary to increase the speed of the second motor 13 significantly to propel the vehicle 1. In this case, therefore, the second motor 13 is allowed to generate the torque Tmg2 sufficiently to execute the torque assist control and the stimulation intensity of the acceleration G sensed by the driver can be increased. For this reason, in the examples shown in FIGS. 6a and 6b, an evaluation score B2 of acceleration feeling in the case of executing the torque assist control by the second motor 13 is higher than an evaluation score B1 of acceleration feeling in the case of executing the shift assist control by the first motor 3 (B1<B2).

Figure 7A:
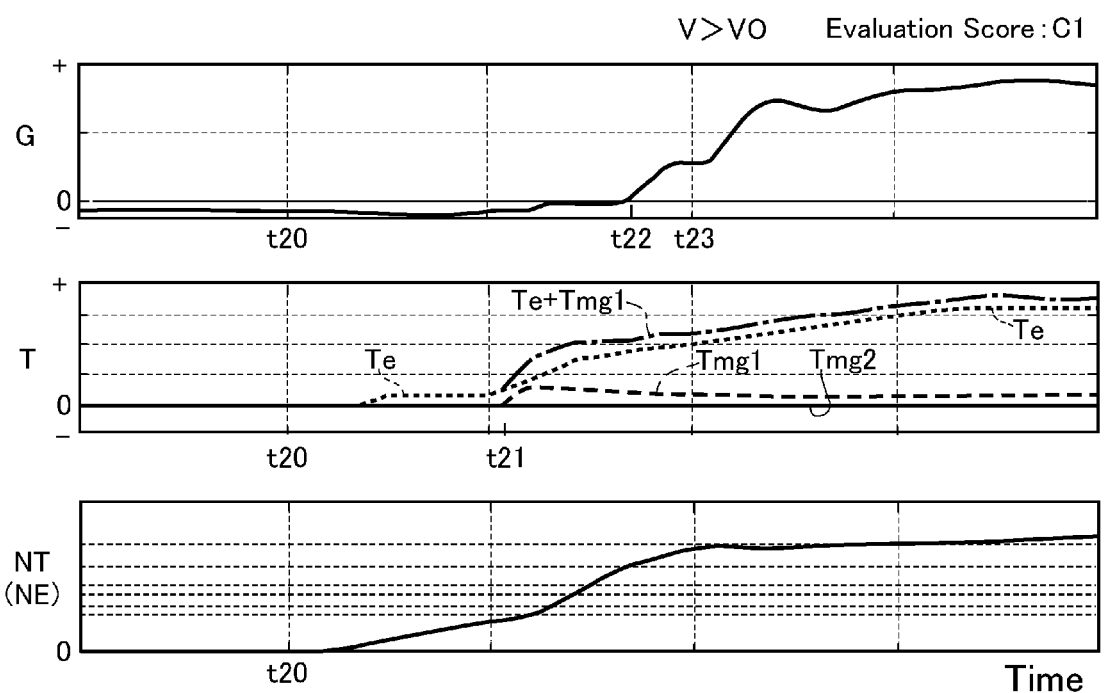
FIGS. 7a and 7b are time charts showing temporal changes in acceleration, torque, and input speed, during execution of the shift assist control by the first motor and the torque assist control by the second motor when accelerating the vehicle decelerating at a high speed.
Figure 7B:
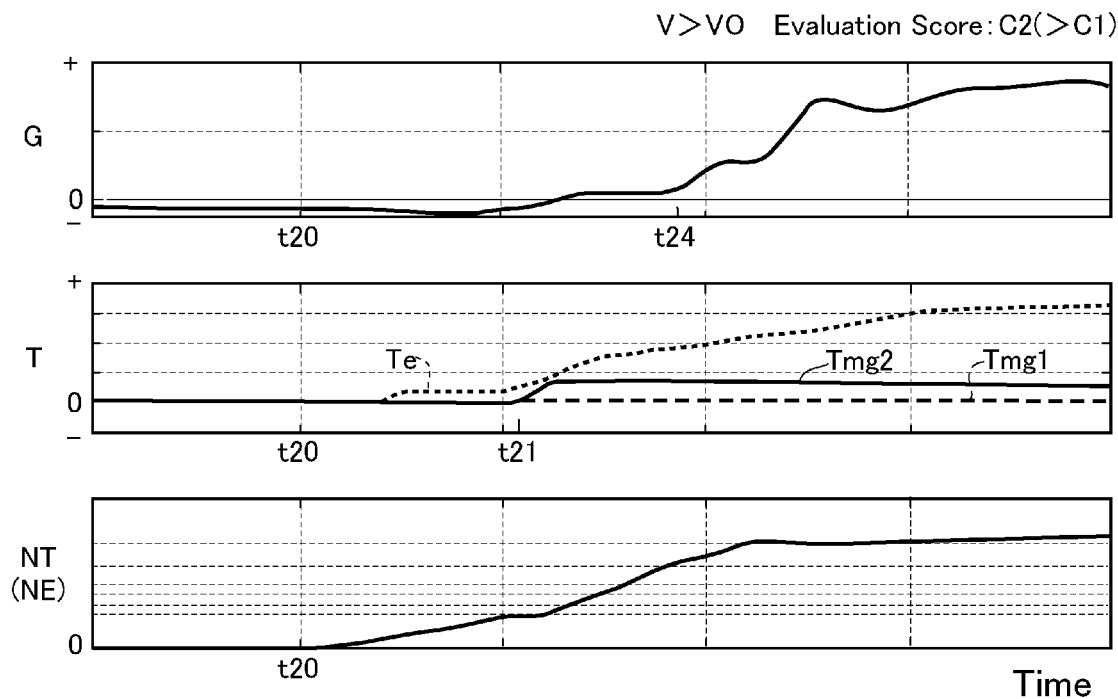

FIGS. 7a and 7b show examples of executing the routine shown in FIG. 3 in a condition where the vehicle 1 is decelerated at a speed higher than the reference speed V0, and the condition to execute the step shifting is satisfied due to increase in the required drive force. Specifically, FIG. 7a shows a situation in which the shift assist control by the first motor 3 is executed in the above-mentioned condition, and FIG. 7b shows a situation in which the torque assist control by the second motor 13 is executed in the above-mentioned condition. In this case, before executing the routine shown in FIG. 3, the vehicle 1 is being decelerated and hence the acceleration G is negative. In this situation, the torque T of the prime mover (Te, Tmg1, Tmg2), and the input speed NT are zero. The accelerator pedal is depressed at point t20, that is, the required drive force is increased at point t20. Consequently, the engine 2 is cranked by the first motor 3, in other words, a motoring of the engine 2 is executed and the engine speed NE is increased gradually. When the startup of the engine 2 is completed, the engine torque Te starts increasing. In the case of executing the shift assist control by the first motor 3, as shown in FIG. 7a, the output torque Tmg1 of the first motor 3 increases from point t21, and the input speed NT is increased when the engine speed NE reaches a self-sustaining speed. As a result, the downshifting of the transmission 4 is expedited. In this case, however, the torque assist control by the second motor 13 is not executed. For this reason, in the initial phase of an increase in the depression ACC of the accelerator pedal, the acceleration G as a deceleration is increased only to around zero. Then, since the input speed NT has been raised to expedite execution of downshifting, the downshifting of the transmission 4 to the interim stage is completed at point t22, and consequently the acceleration G is further increased. Thereafter, the downshifting from the interim stage to the target stage set based on the required drive force thus increased is completed at point t23. Consequently, the speed ratio is further increased so that the drive force as well as the acceleration G is further increased. Thereafter, since the engine torque Te is still increased, the acceleration G is further increased with an increase in the engine torque Te. During execution of the downshifting from the interim stage to the target stage, neither of the assist controls is executed. In this situation, however, the startup of the engine 2 has already been completed and the engine torque Te is generated sufficiently by the engine 2. In this situation, although the increase in the acceleration G plateaus temporarily, such plateau of the acceleration G is merely temporal and will not be sensed by the driver. That is, the driver may not notice that the downshifting is executed stepwise. However, in the case of executing the shift assist control by the first motor 3, the driver may not sense the increase in the acceleration G until point t22 after point t21. That is, the plateau period is increased.

In the case of executing the torque assist control by the second motor 13, as shown in FIG. 7b, the second motor 13 generates the torque Tmg2 at point t21 to drive the front wheels 10. Consequently, in the initial phase of an increase in the depression ACC of the accelerator pedal, the acceleration G as a deceleration is increased to a level higher than the level of the case of executing the shift assist control by the first motor 3. In this case, the input speed NT is raised only by the engine 2, therefore, the downshifting is not expedited, and the downshifting to the interim stage is completed at point t24 after point t22. Consequently, the acceleration G is further increased from point t24. Thereafter, the acceleration G is further increased as explained in the example shown in FIG. 7a. That is, the driver is allowed to sense the increase in the acceleration G continuously.

In the case of executing the shift assist control by the first motor 3, although downshifting of the transmission 4 is expedited, an increasing amount of the acceleration G in the initial phase is relatively small. Specifically, in the example shown in FIG. 7a, the acceleration G is increased in the initial phase merely to a level comparative to a level achieved by cancelling an engine braking force. By contrast, in the case of executing the torque assist control by the second motor 13, the output torque of the second motor 13 is delivered to the front wheels 10 as the drive wheels in the four-wheel drive mode. In this case, therefore, the acceleration G of the vehicle 1 can be further increased. Especially, in the examples shown in FIGS. 7a and 7b, the vehicle 1 being decelerated is accelerated. Therefore, the stimulation intensity of the acceleration G sensed by the driver can be increased without increasing the output torque Tmg2 of the second motor 13 significantly. For this reason, in the examples shown in FIGS. 7a and 7b, an evaluation score C2 of acceleration feeling in the case of executing the torque assist control by the second motor 13 is higher than an evaluation score C1 of acceleration feeling in the case of executing the shift assist control by the first motor 3 (C1<C2).

Figure 8A:
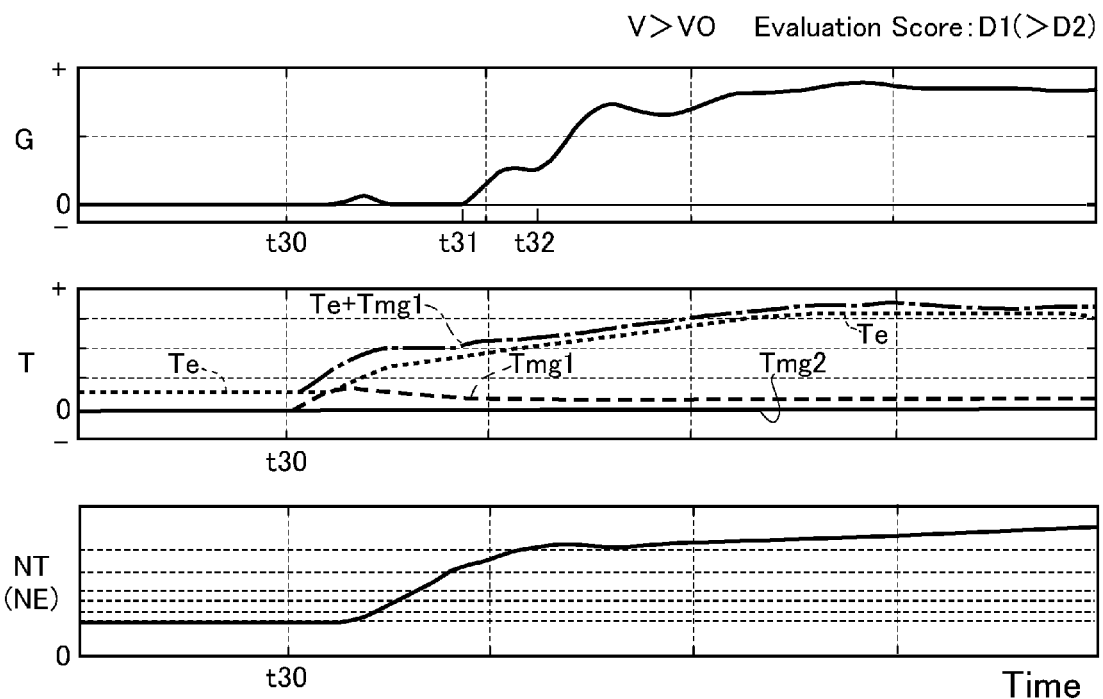
FIGS. 8a and 8b are time charts showing temporal changes in acceleration, torque, and input speed, during execution of the shift assist control by the first motor and the torque assist control by the second motor when accelerating the vehicle cruising at a high speed.
Figure 8B:
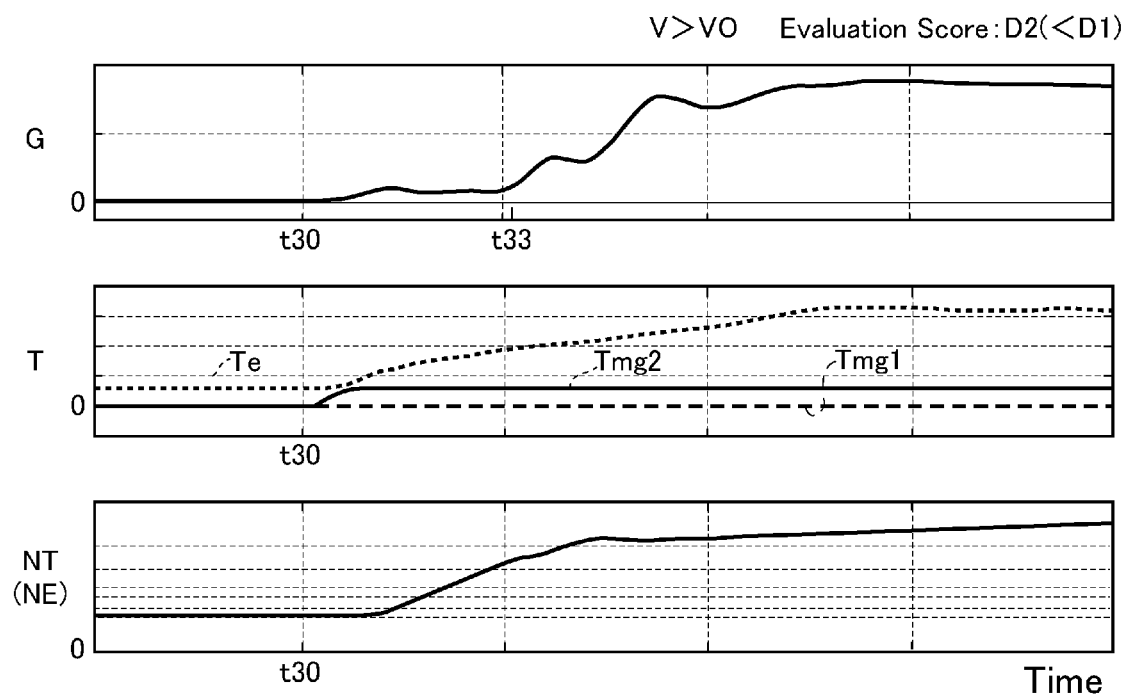

FIGS. 8a and 8b show examples of executing the routine shown in FIG. 3 in a condition where the vehicle 1 is cruising at a speed higher than the reference speed V0, and the condition to execute the step shifting is satisfied due to increase in the required drive force. Specifically, FIG. 8a shows a situation in which the shift assist control by the first motor 3 is executed in the above-mentioned condition, and FIG. 8b shows a situation in which the torque assist control by the second motor 13 is executed in the above-mentioned condition. In this case, before executing the routine shown in FIG. 3, the vehicle 1 is cruising and hence an acceleration G is substantially zero. In this situation, the engine 2 generates a torque Te to maintain the vehicle speed V against a road load at a predetermined speed NE. On the other hand, neither of the first motor 3 and the second motor 13 is operated as a motor nor a generator, therefore, the torque Tmg1 of the first motor 3 and the torque Tmg2 of the second motor 13 are respectively zero. The accelerator pedal is depressed at point t30, that is, the required drive force is increased at point t30. Consequently, the engine torque Te is increased gradually from point t30 with an increase in depression ACC of the accelerator pedal. In the case of executing the shift assist control by the first motor 3, as shown in FIG. 8a, the input speed NT is increased gradually by the output torque Tmg1 of the first motor 3 slightly after the increase in the engine torque Te. In this case, execution of downshifting is expedited by thus raising the input speed NT by the output torque Tmg1 of the first motor 3 so that the downshifting of the transmission 4 to the interim stage is completed at point t31. Consequently, the acceleration G is increased gradually with an increase in a speed ratio of the transmission 4. Thereafter, the downshifting from the interim stage to the target stage set based on the required drive force thus increased is completed at point t33. Consequently, the speed ratio is further increased so that the drive force as well as the acceleration G is further increased. Thereafter, when the engine speed NE or the like reaches a speed to be achieved in the target stage, the acceleration G is further increased with an increase in the engine torque Te. In the case of example shown in FIG. 8a, therefore, an increase in the acceleration G is sensed by the driver at point t31, and the acceleration G plateaus from point t30 to point t31. In this case, the engine torque Te is consumed to increase the speeds of the engine 2 itself and the transmission 4, and the torque assist control by the second motor 13 is not executed. For this reason, in the initial phase of an increase in the depression ACC of the accelerator pedal, the acceleration G is increased temporarily but only to around zero.

In the case of executing the torque assist control by the second motor 13, as shown in FIG. 8b, the second motor 13 generates the torque Tmg2 when the accelerator pedal is depressed at point t30 to drive the front wheels 10. Consequently, in the initial phase of an increase in the depression ACC of the accelerator pedal, the acceleration G as a deceleration is increased to a level higher than the level of the case of executing the shift assist control by the first motor 3. In this case, however, the vehicle 1 is propelled at a high speed and hence the second motor 13 is required to generate the torque Tmg2 at a high speed. That is, the torque Tmg2 generated by the second motor 13 in this situation is insufficient to achieve the required drive force thus increased, and hence the acceleration G is not increased to a level possible to be sensed by the driver. In addition, the input speed NT is raised only by the engine 2, therefore, the downshifting is not expedited and is completed at point t33 after point t31. Consequently, the acceleration G is further increased from point t33. Thereafter, the acceleration G is further increased as explained in the example shown in FIG. 8a. Therefore, the driver may not sense the increase in the acceleration G until point t33. That is, the plateau period is increased from point t30 to point t33.

In the case of executing the shift assist control by the first motor 3, execution of downshifting of the transmission 4 is expedited so that the driver is allowed to sense an increase in the acceleration G relatively in short time. That is, the plateau period of the acceleration G is reduced. By contrast, in the case of executing the torque assist control by the second motor 13, the second motor 13 is required to generate the torque Tmg2 at a high speed. That is, the second motor 13 is not allowed to generate the torque Tmg2 sufficiently to increase the acceleration G. In this case, therefore, the acceleration G may not be increased to a level possible to be sensed by the driver. In addition, since the shift assist control is not executed by the first motor 3, the termination of the downshifting is delayed and hence the plateau period of the acceleration G is increased. That is, it takes longer time to allow the driver to sense the increase in the acceleration G. For these reasons, in the examples shown in FIGS. 8a and 8b, an evaluation score D1 of acceleration feeling in the case of executing the shift assist control by the first motor 3 is higher than an evaluation score D2 of acceleration feeling in the case of executing the torque assist control by the second motor 13 (D1>D2).

In the case of propelling the vehicle having the automatic transmission at a constant high speed, a gear stage of small speed ratio is set in the transmission and hence a drive force to propel the vehicle is small. In this situation, when the accelerator pedal is depressed to accelerate the vehicle, the gear stage of the transmission may be shifted to a stage two or more stages lower than the current stage to increase the drive force. Such shifting operation is called a "skip shifting". In this case, the gear stage may not be shifted directly to a target stage. Specifically, the gear stage may be shifted temporarily to an interim stage where a speed ratio is in between the ratios of the current stage and the target stage, and further shifted from the interim stage to the target stage. As described, such shifting operation is called the "step shifting". According to the embodiment of the present disclosure, the above-explained selective control may also be executed in the event of the skip shifting. Specifically, in the event of skip downshifting at a high speed, the shift assist control by the first motor 3 is executed to raise the input speed NT when shifting from the current stage to the interim stage, and the torque assist control by the second motor 13 is executed to increase the drive force of the front wheels 10 when shifting from the interim stage to the target stage.

Figure 9:
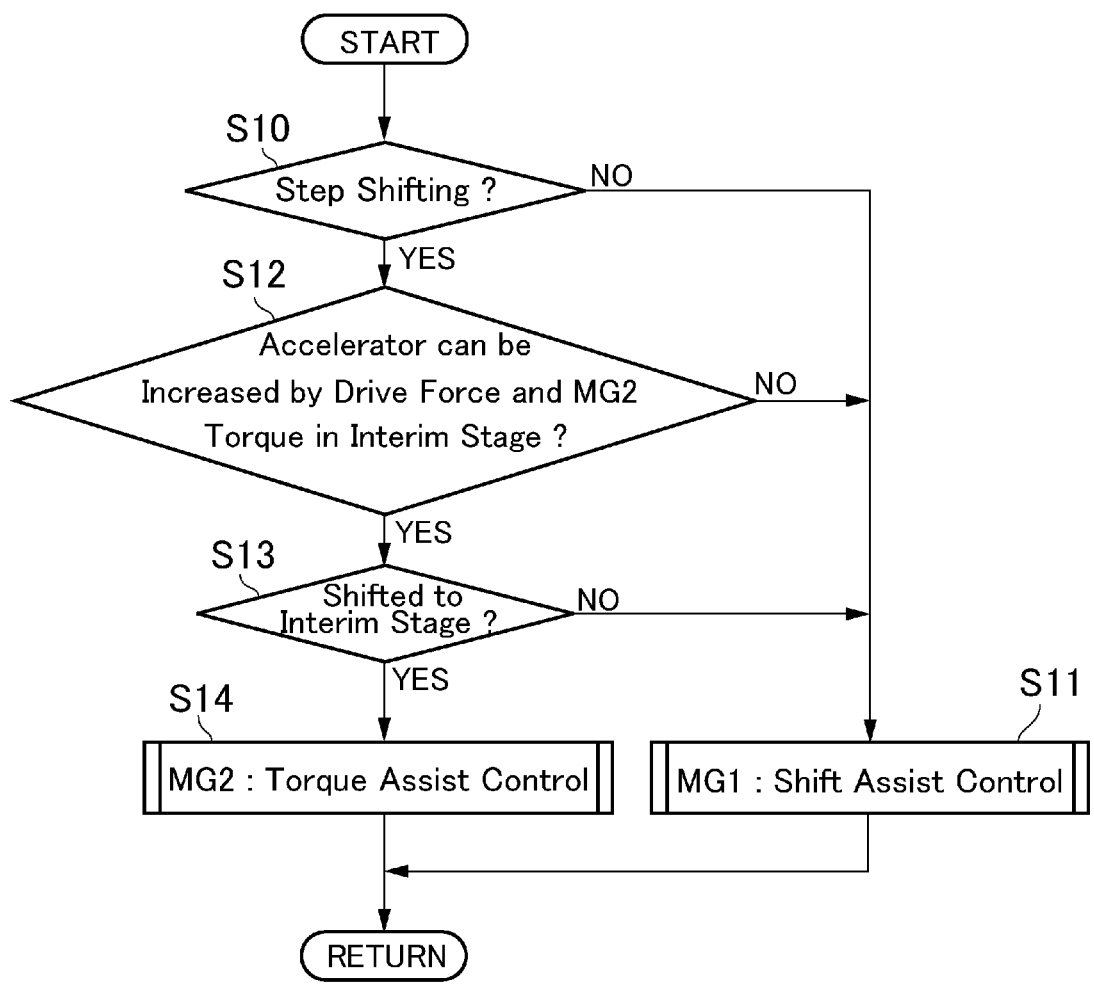
FIG. 9 is a flowchart showing a routine to selectively execute the first assist control and the second assist control during execution of a step downshifting.

In order to selectively execute the shift assist control and the torque assist control in the event of skip downshifting, the control system according to the embodiment executes a routine shown in FIG. 9. The routine shown in FIG. 9 is executed when the required drive force increased to an extent to cause a downshifting during propulsion of the vehicle 1. At step S10, it is determined whether the step downshifting is to be executed. As described, the target stage is determined based on the depression ACC of the accelerator pedal and the vehicle speed V with reference to the shift map. Accordingly, the determination at step S10 can be made by comparing the current gear stage to the target stage thus determined.

If the answer of step S10 is NO, the routine progresses to step to execute the shift assist control by increasing the input speed NT by the first motor 3 to expedite execution of the downshifting, and thereafter returns. As explained with reference to FIGS. 8a and 8b, if the vehicle 1 is propelled at a high speed, the acceleration may not be increased sufficiently by the output torque of the second motor 13. In this case, therefore, the shift assist control by the first motor 3 is executed to expedite execution of the downshifting thereby reducing the plateau period of the acceleration to improve acceleration feeling.

By contrast, if the answer of step S10 is YES, the routine progresses to step S12 to determine whether the acceleration can be increased sufficiently by a drive force generated by the engine 2 and a drive force generated by the second motor 13 in the interim stage. That is, at step S12, it is determined whether the second motor 13 is allowed to generate the torque sufficiently to achieve the increased required drive force. A reference acceleration to make the determination at step S12 can be set depending on a class or grade of the vehicle based on a result of experiment or simulation. The torque possible to be generated by the second motor 13 can be estimated based on the electricity possible to be supplied from the electric storage device 14 and a torque characteristic of the second motor 13.

If the answer of step S12 is NO, the routine also progresses to step S11 to execute the shift assist control by increasing the input speed NT by the first motor 3 to expedite execution of the downshifting, and thereafter returns. That is, in this case, the stimulation intensity cannot be increased sufficiently. Therefore, the shift assist control by the first motor 3 is executed to reduce the plateau period of the acceleration thereby improving acceleration feeling.

If the answer of step S12, the routine progresses to step S13 to determine whether the gear stage has been shifted to the interim stage. In other words, it is determined whether the speed ratio has been increased to a ratio to be achieved in the interim stage. If the speed ratio has not yet been increased to the ratio to be achieved in the interim stage so that the answer of step S13 is NO, the routine also progresses to step S11 to execute the shift assist control by the first motor 3, and thereafter returns. Thus, according to the routine shown in FIG. 9, the shift assist control by the first motor 3 is executed first to expedite downshifting to the interim stage in the event of the step downshifting. In this situation, the torque assist control may be executed simultaneously by operating the second motor 13 as a motor to generate torque, even if the torque of the second motor 13 is insufficient.

If the gear stage has been shifted to the interim stage so that the answer of step S13 is YES, the routine progresses to step S14 to execute the torque assist control by the second motor 13. As a result of shifting the gear stage to the interim stage, the drive force and the acceleration are increased in accordance with the speed ratio in the interim stage, and the driver is allowed to sense the increase in the acceleration. In this case, therefore, it is unnecessary to operate the first motor 3 as a motor to increase the input speed NT. For this reason, the torque assist control by the second motor 13 is executed instead of the shift assist control by the first motor 3. By thus inhibiting execution of the shift assist control by the first motor 3, the electricity accumulated in the electric storage device 14 is supplied only to the second motor 13 so that the second motor 13 is allowed to generate torque sufficiently in accordance with power supply from the electric storage device 14. Consequently, the vehicle 1 is propelled by the drive force generated by the engine 2 and the drive force generated by the second motor 13, and hence the acceleration of the vehicle 1 can be increased. In this situation, the input speed NT has already been changed toward the speed to be achieved in the interim stage so that the input speed NT is raised sufficiently by the output torque of the engine 2. For this reason, the driver is allowed to sense the acceleration increased by shifting the gear stage to the interim speed after the short plateau period, and then the acceleration is further increased by the output torque of the second motor 13. Thus, the acceleration of the vehicle 1 can be increased rapidly without delay so as to improve the acceleration feeling.

Figure 10A:
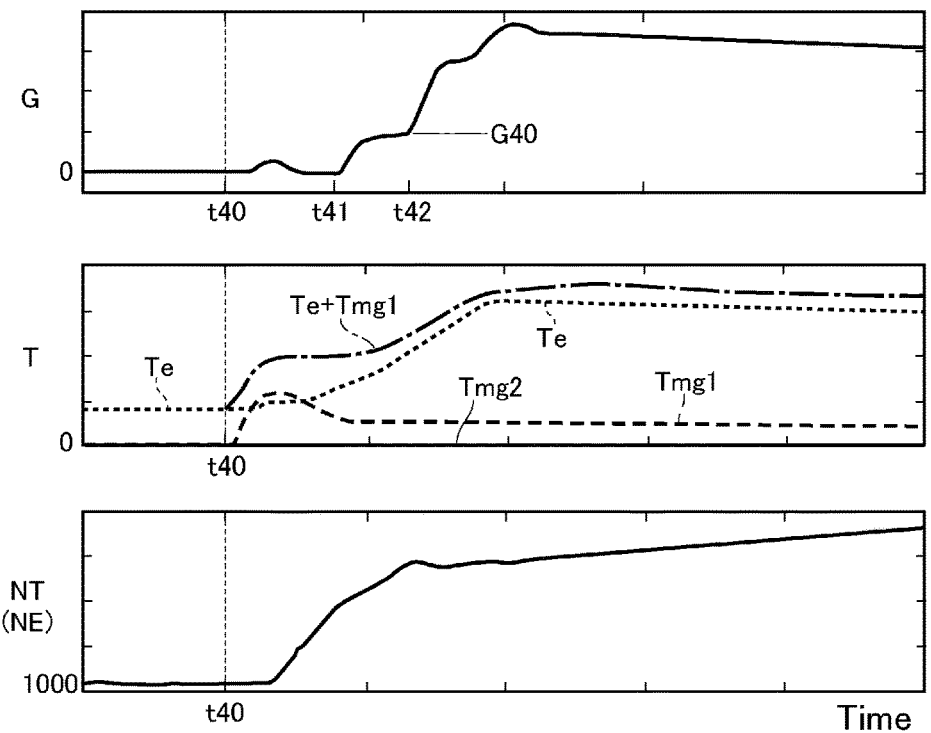
FIGS. 10a and 10b are time charts showing temporal changes in acceleration, torque, and input speed, during execution of the shift assist control by the first motor and the torque assist control by the second motor when accelerating the vehicle cruising at a high speed while executing the step downshifting.
Figure 10B:
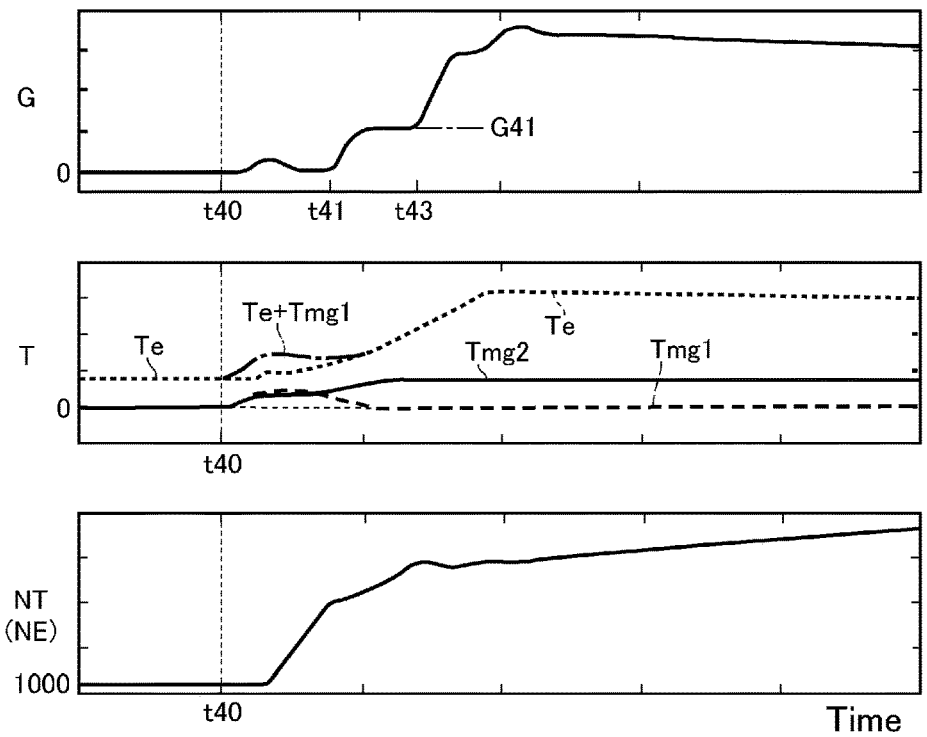

FIGS. 10a and 10b show examples of executing the routine shown in FIG. 9 in a condition where the step downshifting is executed in the vehicle 1 is cruising at a high speed. Specifically, FIG. 10a shows a situation in which only the shift assist control by the first motor 3 is executed in the above-mentioned condition. In this case, before executing the routine shown in FIG. 9, the engine 2 generates the torque Te to keep the vehicle speed V to a constant speed while rotating at a speed in accordance with the vehicle V. In this situation, since the vehicle 1 is cruising, the acceleration G of the vehicle 1 is substantially zero. On the other hand, neither of the first motor 3 and the second motor 13 is operated as a motor nor a generator, therefore, the torque Tmg1 of the first motor 3 and the torque Tmg2 of the second motor 13 are respectively zero. The accelerator pedal is depressed at point t40, that is, the required drive force is increased at point t40. Consequently, at point t40 or immediately after point t40, the engine torque Te and the torque Tmg1 of the first motor 3 are increased, and thereafter the input speed NT starts increasing. In this situation, since the output torque Te of the engine is consumed almost completely to increase the rotational speed, the acceleration G is not increased significantly.

As a result of thus raising the input speed NT by the first motor 3, the downshifting is expedited so that the gear stage is shifted to the interim stage at point t41 in relatively short time. Consequently, the output torque Te of the engine 2 is increased in accordance with the speed ratio in the interim stage so that the acceleration G is increased. However, since only the engine 2 serves as a prime mover, the acceleration G is increased by the engine torque Te only to a level G40. In this situation, the shift assist control is still in execution to increase the input speed NT by the first motor 3, therefore, the downshifting from the interim stage to the target stage is commenced in relatively short time at point t42. As a result, the acceleration G is further increased.

FIG. 10b shows a situation in which the torque assist control by the second motor 13 is executed when shifting the gear stage from the interim stage to the target stage in the above-mentioned condition, in addition to the shift assist control by the first motor 3. In this case, since the shift assist control is executed to raise the input speed NT, as the example shown in FIG. 10a, the gear stage is shifted to the interim stage at around point t41 in relatively short time. In this situation, the shift assist control by the first motor 3 is terminated and hence the output torque Tmg1 of the first motor 3 is reduced to zero. At the same time, the electricity consumed by the first motor 3 so far is supplied to the second motor 13 so that the output torque Tmg2 of the second motor 13 is increased. That is, the torque assist control by the second motor 13 is executed. Consequently, the vehicle 1 is propelled by the drive force established by the engine torque Te multiplied by the speed ratio of the interim stage and the output torque Tmg2 added to the engine torque Te. As a result, the acceleration G is increased to a level G41 that is higher than the aforementioned level G40 of the case in which the vehicle 1 is propelled only by the engine 2. In this case, since the shift assist control by the first motor 3 has already been terminated, an increase in the input speed NT is slightly delayed in comparison with the example shown in FIG. 10a. Therefore, the gear stage is shifted from the interim stage to the target stage at point t43 after point t42, and the acceleration G is further increased.

In the case of executing only the shift assist control by the first motor 3 as shown in FIG. 10a, the gear stage is shifted to the interim stage in relatively short time so that the driver is allowed to sense the increase in the acceleration G in relatively short time. That is, the plateau period of the acceleration G is short. However, since the acceleration G established in the interim stage is small, an increase in the acceleration G temporarily plateaus, in other words, the acceleration G is increased stepwise. In this case, if the shift assist control by the first motor 3 is executed continuously during execution of the step downshifting, the shifting operation may not be executed smoothly and hence the acceleration feeling may be reduced. In this case, therefore, an evaluation score E1 of acceleration feeling is low. By contrast, in the example shown in FIG. 10b, the shift assist control by the first motor 3 is executed in the initial phase to expedite the downshifting to the interim stage, and then the torque assist control by the second motor 13 is executed during execution of the downshifting from the interim stage to the target stage. In this case, the driver is allowed to sense the increase in the acceleration G in relatively short time when shifting to the interim stage. In addition, the acceleration G is increased sufficiently in the interim stage. In this case, therefore, the acceleration G can be increased rapidly and sufficiently in response to the depression ACC of the accelerator pedal. For these reasons, the evaluation score E2 in the example shown in FIG. 10b is higher than the evaluation score E1 in the example shown in FIG. 10a (E2>E1).

Figure 11:
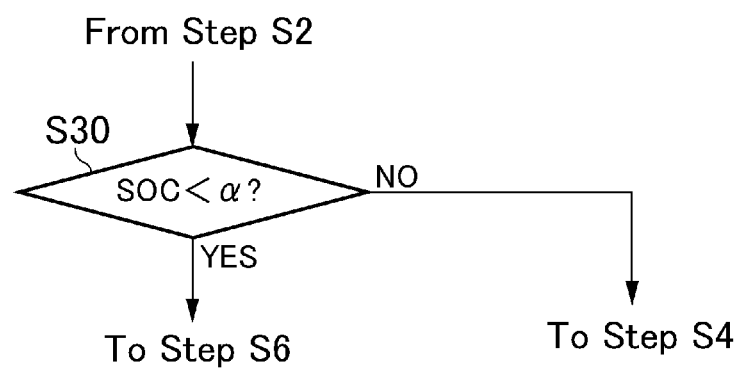
FIG. 11 is a flowchart showing an alternative determination step which can be executed instead of steps S3 and S5 shown in FIG. 3.

Although the above exemplary embodiment of the present disclosure has been described, it will be understood by those skilled in the art that the present disclosure should not be limited to the described exemplary embodiment, and various changes and modifications can be made within the scope of the present disclosure. For example, insufficiency of the output torque of the second motor 13 to achieve the required drive force may also be made based on the SOC level of the electric storage device 14. In this case, step S30 shown in FIG. 11 is executed instead of the foregoing steps S3 and S5. Specifically, it is determined at step S30 whether the SOC level of the electric storage device 14 is lower than a predetermined level a. If the SOC level of the electric storage device 14 is lower than the predetermined level a so that the answer of step S30 is YES, the routine progresses to step S6 to execute the shift assist control by the first motor 3, and thereafter returns. By contrast, if the SOC level of the electric storage device 14 is higher than the predetermined level a so that the answer of step S30 is NO, the routine progresses to step S4 to execute the torque assist control by the second motor 13. The predetermined level a may be set to a level lower than a level required to generate a maximum available output torque of the second motor 13. For example, the predetermined level a may be set to a level at which the second motor 13 is allowed to generate a required torque to execute the torque assist control when accelerating the vehicle 1. If the predetermined level a is set to the above-explained level, the acceleration feeling may not be increased by the torque assist control by the second motor 13 in the case that the SOC level is lower than the predetermined level a. In this case, therefore, the shift assist control by the first motor 3 is executed instead of the torque assist control by the second motor 13. As described, the first motor 3 is operated mainly as a generator and hence a capacity thereof is smaller than a capacity of the second motor 13. In addition, in order to increase the input speed NT, a required torque of the first motor 3 is smaller than a required torque of the second motor 13. For these reasons, execution of downshifting can be expedited by executing the shift assist control by the first motor 3 to increase the acceleration rapidly. Consequently, acceleration feeling may be improved.

In addition, the shift assist control by the first motor 3 and the torque assist control by the second motor 13 may also be executed selectively during propulsion in so-called a series hybrid mode (or an EV mode) in which the first motor 3 is operated as a generator by the engine 2, and the second motor 13 is operated as a motor by the electricity generated by the first motor 3 to propel the vehicle 1. In this case, the second motor 13 is allowed to generate torque sufficiently if the vehicle speed is low. Therefore, the acceleration of the vehicle 1 may be increased sufficiently by increasing the output torque of the second motor 13 when the required drive force is increased. By contrast, if the vehicle speed is high, the output torque of the second motor 13 is consumed to propel the vehicle 1 and hence available torque of the second motor 13 is small. In this case, therefore, the input speed NT is raised rapidly by operating the first motor 3 as a motor. As a result, execution of downshifting is expedited to reduce the plateau period of acceleration thereby improving the acceleration feeling.

Further, the control system according to the embodiment may also be applied to a rear-drive or front-drive hybrid vehicle. In a case of applying the control system to those kinds of two-wheel-drive hybrid vehicles, the second motor 13 may be connected to drive wheels without interposing an automatic transmission therebetween.

What is claimed is:

1. A control system for a hybrid vehicle in which an engine and a first motor are connected to an input side of an automatic transmission, and a second motor is connected to drive wheels, comprising:
    a controller that controls the first motor and the second motor,
    wherein the controller is configured to
        calculate a required drive force,
        execute a selective control to selectively execute a first assist control to raise an input speed to the automatic transmission by the first motor, and a second assist control to increase an output torque of the second motor thereby increasing the drive force to propel the hybrid vehicle, based on the required drive force,
        execute an acceleration demand determination to determine whether a driver intends to accelerate the hybrid vehicle,
        execute a drive force determination Whether the output torque possible to b generated by the second motor is insufficient to achieve the required drive force to accelerate the hybrid vehicle, after executing the acceleration demand determination,
        select the first assist control when the output torque possible to be generated by the second motor is insufficient to achieve the required drive force, and
        select the second assist control when the second motor is allowed to generate the output torque to achieve the required drive,
    wherein the acceleration demand determination is made based on an increase in the required drive force and a condition to execute a downshift is satisfied, and
    wherein the first assist control is executed to expedite execution of a downshifting by raising the input speed by the first motor.

2. The control system for the hybrid vehicle as claimed in claim 1, wherein the drive force determination is made based on a fact that a speed of the hybrid vehicle is higher than a reference speed.

3. The control system for the hybrid vehicle as claimed in claim 1, wherein the drive force determination includes a determination whether a speed of the hybrid vehicle is higher than a reference speed, and the required drive force was constant to cruise the hybrid vehicle immediately before the acceleration is demanded.

4. The control system for the hybrid vehicle as claimed in claim 1, further comprising:
    an electric storage device that supplies electricity to the first motor and the second motor,
    wherein the drive force determination includes a determination whether a state of charge level of the electric storage device is lower than a level at which the second motor is allowed to generate a required power to execute the second assist control.

5. The control system for the hybrid vehicle as claimed in claim 1, wherein the controller is further configured to inhibit execution of the second assist control by the second motor during execution of the first assist control by the first motor.

6. The control system for the hybrid vehicle as claimed in claim 1, wherein the controller is further configured to stop electric power supply to the second motor when raising the input speed by the first motor.

7. The control system for the hybrid vehicle as claimed in claim 1, wherein the controller is further configured to
    determine whether the downshifting to be executed in response to an increase in the acceleration demand is a step shifting to shift a gear stage of the automatic transmission to a target stage that is two or more stages lower than the current stage via an interim stage,
    execute the first assist control to expedite execution of the downshifting by raising the input speed to the automatic transmission by the first motor until the completion of the downshifting, if execution of the step shifting is determined, and
    execute the second assist control to drive the second motor when shifting the gear stage from the interim stage to the target stage.

8. The control system for the hybrid vehicle as claimed in claim 1,
    wherein the hybrid vehicle comprises front wheels to which the second motor is connected, rear wheels to which the torque is delivered from the automatic transmission, and a transfer that delivers the torque delivered from the automatic transmission to the front wheels, and the second motor is connected to the transfer.

* * * * *